United States Patent
Thompson et al.

(10) Patent No.: US 7,003,395 B1
(45) Date of Patent: Feb. 21, 2006

(54) AUTOMATIC THERMOSTAT MODE TIME LIMIT FOR AUTOMATIC START AND STOP ENGINE CONTROL

(75) Inventors: Marleen Thompson, Mount Clemens, MI (US); Thomas Diefenbaker, Troy, MI (US); Richard Avery, West Bloomfield, MI (US); Tomislav Golub, Birmingham, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 11/024,142

(22) Filed: Dec. 28, 2004

(51) Int. Cl.
*G06F 17/00* (2006.01)

(52) U.S. Cl. .................................. 701/113
(58) Field of Classification Search ............... 701/113, 701/102, 29, 35; 123/339.24; 73/117.3
See application file for complete search history.

(56) References Cited

U.S. PATENT DOCUMENTS

| | | | |
|---|---|---|---|
| 4,393,834 A * | 7/1983 | Doherty, Jr. ........... | 123/339.24 |
| 5,685,270 A | 11/1997 | Sekiguchi et al. | |
| 5,775,291 A | 7/1998 | Choi | |
| 5,819,705 A | 10/1998 | Scherer et al. | |
| 6,223,720 B1 | 5/2001 | Kramer et al. | |
| 6,305,343 B1 | 10/2001 | Sato et al. | |
| 6,354,269 B1 | 3/2002 | Saito et al. | |
| 6,484,686 B1 | 11/2002 | Ordanic | |
| 6,488,005 B1 | 12/2002 | Kim | |
| 6,561,157 B1 | 5/2003 | zur Loye et al. | |
| 6,571,770 B1 | 6/2003 | Codan et al. | |
| 6,684,849 B1 | 2/2004 | zur Loye et al. | |
| 6,694,245 B1 | 2/2004 | Minami et al. | |
| 6,945,207 B1 * | 9/2005 | Biess et al. ........... | 123/142.5 R |
| 2002/0103585 A1 * | 8/2002 | Biess et al. .................... | 701/35 |

* cited by examiner

*Primary Examiner*—Hieu T. Vo
(74) *Attorney, Agent, or Firm*—Brooks Kushman P.C.

(57) ABSTRACT

A control system for vehicle engines includes an automatic start and stop idling feature. The control starts engine running in response to detected engine conditions such as oil temperature of battery voltage in at least one mode, and in response to a thermostatic mode by a comfort thermostat in a cabin in at least a thermostat mode of operation. The thermostat mode operation is modified to terminate responses to inputs from the thermostat after an extended period for operation matches programmed threshold representative of no occupation in the area with the thermostat.

9 Claims, 3 Drawing Sheets

AUTOMATIC THERMOSTAT MODE TIME LIMIT FOR AUTOMATIC START AND STOP ENGINE CONTROL

BACKGROUND OF THE INVENTION

1. Field of the Invention

The present invention relates to vehicle engine controls including automated engine start and stop control systems and enabling a thermostat mode time limit in response to a detection of an extended interval of operation meeting a threshold programmable to represent extended unattended operation.

2. Background Art

An engine electronic control module may include an automated start and stop idle function. The control uses data to continuously monitor inputs such as engine temperature and battery voltage. During periods when the vehicle is not moving, the system automatically starts and stops the engine as necessary to maintain the temperature of the fuel in the engine at a desirable level for combustion and battery voltage within defined limits.

In one known unit, a driver enables the automated start and stop feature by shifting the transmission to neutral (and high range, if available), setting the parking brake and turning cruise control on while the engine is idling. The hood/engine compartment doors must also be closed. Once the idle shutdown timer expires in the control, the feature takes control until the next time the vehicle is driven, or until an operator simply turns off the ignition to disable the automated start and stop features.

A previously known system also includes an optional thermostat for tractors equipped with a sleeper berth that allows automated start and stop features to maintain cab temperature in the desired range. It is also available for coach applications to keep the interior temperature within the desired range. The thermostat has a lighted display and control panel for easy use and may be switched off if controlling interior temperature is not desired. The driver sets the desired interior temperature. Three driver-selectable "comfort zone" settings control thermostat sensitivity. A small zone will closely maintain temperature while a larger zone results in greater savings by commanding the engine to start and run less frequently. Continuous idling is allowed at extreme outside temperatures. However, when a vehicle is parked unattended for more than a day, the setting of thermostatic mode may continue to operate although the need for passenger comfort no longer exists.

A continuous run control was previously known to allow the engine to run continuously if the outside temperature parameter exceeds the factory set limits (hot and cold) and the thermostat set point can not be met (factory default is 25° F. (−3.88° C.) for cool mode and 90° F. (32° C.) for heat mode). When the thermostat is in the Continuous Run Condition, the thermometer icon will flash along with the heating or cooling icon. However, such systems do not conserve fuel when exceptional conditions such as when the control repeatedly starts the engine soon after shutoff because the battery voltage is low due to an aging battery.

If the conditions triggering Continuous Run Control are not met and the thermostat set point is not met within 45 minutes, the engine will shut down for 15 minutes, restart and run for 15 minutes. This 15 minute on and off cycle will continue until the thermostat set point is reached or until the thermostat is turned off. If automatic start and stop idle enters the extended idle mode of operation, the heat or cool setting on the thermostat may not match the vehicle heating or cooling system setting. Such operation could also be an indication of low freon, blockage in the heater system, or system tampering. However, the system does not prevent unnecessary heating or cooling by engine operations when the vehicle's layover exceeds a time that could be reasonably expected to represent an occupied vehicle.

SUMMARY OF THE INVENTION

The present invention overcomes the above-mentioned disadvantages by providing an automatic start and stop control system with additional inputs and additional responses to the operation of a thermostatic mode operation in an automatic start and stop feature of an electronic control module. The system provides an automatic shutoff of the cabin temperature maintenance aspect of the control when continuous automated start and stop operation in thermostatic mode has been detected for an interval longer than a period which the control determines to be too long for reasonable occupancy. Preferably, the control provides the preferred response of discontinuing thermostatic mode after a sensor detects thermostatic mode operation for an interval exceeding a threshold for thermostatic mode. The interval threshold is preferably programmable to represent at least one selected value representative of non-occupation of the cabin.

BRIEF DESCRIPTION OF THE DRAWINGS

The present invention will be more clearly understood by reference to the following detailed description of a preferred embodiment when read in conjunction with the accompanying drawing, in which like reference characters refer to like parts throughout the views, and in which.

DETAILED DESCRIPTION OF THE PREFERRED EMBODIMENT(S)

Figure 1:
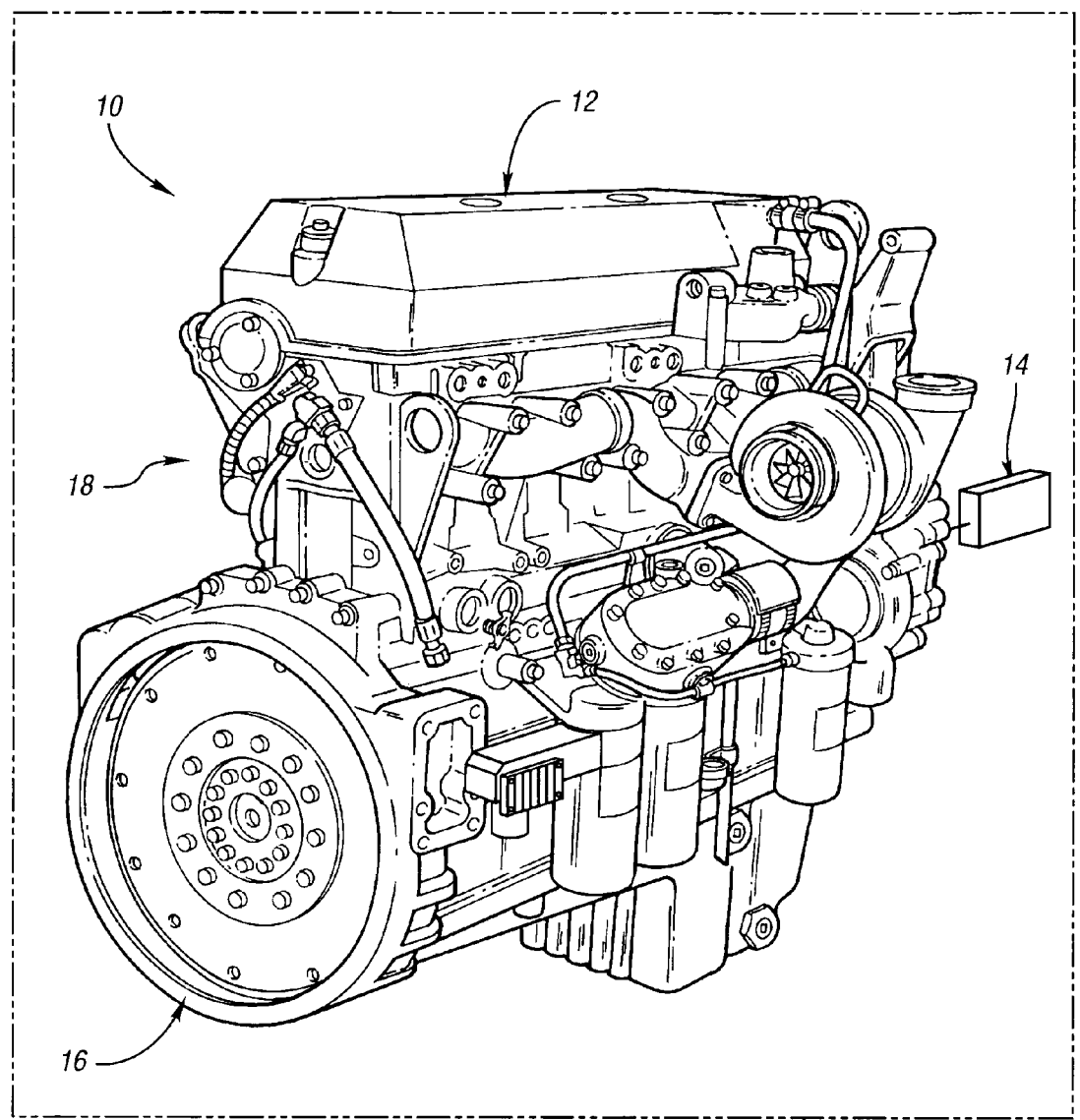
FIG. 1 is a diagrammatic view of a vehicle that includes a perspective view of an engine with an electronic control in accordance with the present invention.

FIG. 1 is a perspective view of a compression-ignition, internal combustion engine 10 incorporating various features of engine control according to the present invention. As will be appreciated by those of ordinary skill in the art, engine 10 may be used in a wide variety of equipment 11 for applications including on-highway trucks, construction equipment, marine vessels, and generators, among others. Engine 10 includes a plurality of cylinders disposed below a corresponding cover, indicated generally by reference numeral 12. In a preferred embodiment, engine 10 is a multi-cylinder compression ignition internal combustion engine, such as a 4, 6, 8, 12, 16, or 24 cylinder diesel engine, for example. Moreover, it should be noted that the present invention is not limited to a particular type of engine or fuel.

Engine 10 includes an engine control module (ECM) 14. ECM 14 communicates with various engine sensors and actuators via associated cabling or wires, indicated generally by reference numeral 18, to form a controller 32 (FIG. 2) to control the engine and equipment 11. In addition, controller 32 communicates with the engine operator using associated lights, switches, displays, and the like as illustrated in greater detail in FIG. 2. When mounted in a vehicle, engine 10 is coupled to a transmission via flywheel 16. As is well known by those in the art, many transmissions include a power take-off (PTO) configuration in which an auxiliary shaft may be connected to associated auxiliary equipment which is driven by the engine/transmission at a relatively constant rotational speed using the engine's variable speed governor (VSG). Auxiliary equipment may include hydraulic pumps for construction equipment, water pumps for fire engines, power generators, and any of a number of other rotationally driven accessories. Typically, the PTO mode is used only while the vehicle is stationary.

Figure 2:
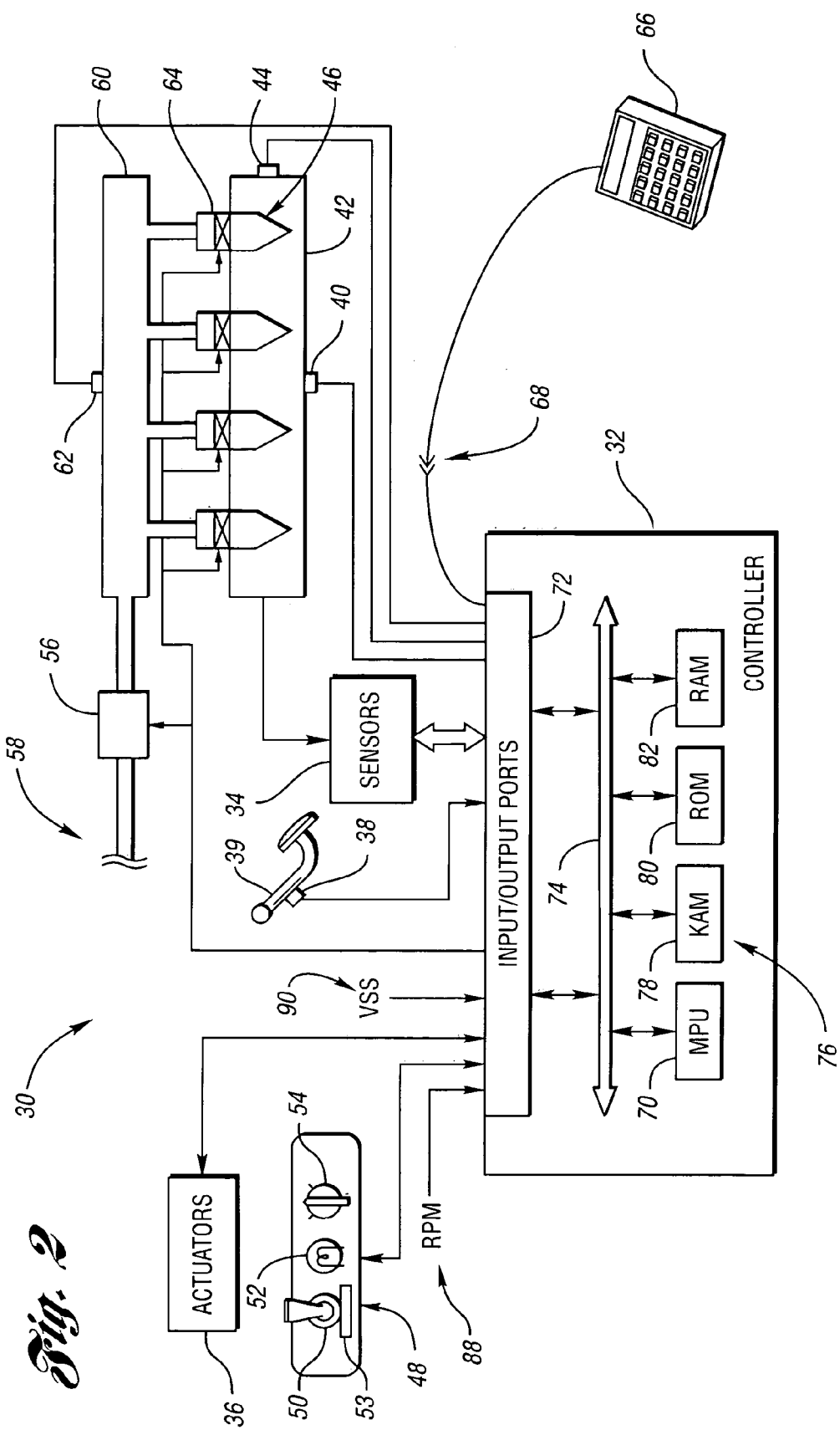
FIG. 2 is a diagrammatic and schematic view of a control system used in the vehicle of FIG. 1.

Referring now to FIG. 2, a block diagram illustrating an engine control system 30 with battery chargeability response according to the present invention is shown. System 30 represents the control system for engine 10 of FIG. 1. System 30 preferably includes a controller 32 in communication with various sensors 34 and actuators 36. Sensors 34 may include various position sensors such as a pedal position sensor 38, that may be coupled to an accelerator pedal 39 (as shown) or a brake pedal. Likewise, sensor 34 may include a coolant temperature sensor 40 which provides an indication of the temperature of engine block 42. Likewise, an oil pressure sensor 44 is used to monitor engine operating conditions by providing an appropriate signal to controller 32. Other sensors may include rotational sensors to detect the rotational speed of the engine, such as RPM sensor 88 and a vehicle speed sensor (VSS) 90 in some applications. VSS 90 provides an indication of the rotational speed of the output shaft or tailshaft of a transmission (not shown) which may be used to calculate the vehicle speed. VSS 90 may also represent one or more wheel speed sensors which are used in anti-lock braking system (ABS) applications, for example, that also may be controlled by the ECM 32.

Actuators 36 include various vehicle components which are operated via associated control signals from controller 32. As indicated in FIG. 2, various actuators 36 may also provide signal feedback to controller 32 relative to their operational state, in addition to feedback position or other signals used to control actuators 36. Actuators 36 preferably include components in addition to as well as a plurality of fuel injectors 46 which are controlled via associated solenoids 64 to deliver fuel to the corresponding cylinders. In one embodiment, controller 32 controls a fuel pump 56 to transfer fuel from a source 58 to a common rail or manifold 60. Operation of solenoids 64 controls delivery of the timing and duration of fuel injection as is well known in the art. While the representative control system of FIG. 2 with associated fueling subsystem illustrates the typical application environment of the present invention, the invention is not limited to any particular type of fuel or fueling system.

Sensors 34 and actuators 36 may be used to communicate status and control information to an engine operator via a console 48. Console 48 may include various switches 50 and 54 in addition to indicators 52. Console 48 is preferably positioned in close proximity to the engine operator, such as in the cab of a vehicle. Indicators 52 may include any of a number of audio and visual indicators such as lights, that may be displayed or illuminated as a response to detection of engine operation in a speed range deemed undesirable, including displays, buzzers, alarms, and the like. Preferably, one or more switches, such as switch 50 and switch 54, are used to request a particular operating mode, such as cruise control or PTO mode, for example.

In one embodiment, controller 32 includes a programmed microprocessing unit 70 in communication with the various sensors 34 and actuators 36 via input/output port 72. As is well known by those of skill in the art, input/output ports 72 provide an interface in terms of processing circuitry to condition the signals, protect controller 32, and provide appropriate signal levels depending on the particular input or output device. Processor 70 communicates with input/output ports 72 using a conventional data/address bus arrangement. Likewise, processor 70 communicates with various types of computer-readable storage media 76 which may include a keep-alive memory (KAM) 78, a read-only memory (ROM) 80, and a random-access memory (RAM) 82. The various types of computer-readable storage media 76 provide short-term and long-term storage of data used by controller 32 to control the engine. Computer-readable storage media 76 may be implemented by any of a number of known physical devices capable of storing data representing instructions executable by microprocessor 70. Such devices may include PROM, EPROM, EEPROM, flash memory, and the like in addition to various magnetic, optical, and combination media capable of temporary and/or permanent data storage.

Computer-readable storage media 76 include data representing program instructions (software), calibrations, operating variables, and the like used in conjunction with associated hardware to control the various systems and subsystems of the engine and/or vehicle. The engine/vehicle control logic is implemented via controller 32 based on the data stored in computer-readable storage media 76 in addition to various other electric and electronic circuits (hardware).

As will be appreciated by persons of skill in the art, control logic may be implemented or effected in hardware, software, or a combination of hardware and software. The various functions are preferably effected by a programmed microprocessor, such as included in the DDEC controller manufactured by Detroit Diesel Corporation, Detroit, Mich. Of course, control of the engine/vehicle may include one or more functions implemented by dedicated electric, electronic, or integrated circuits. As will also be appreciated by those of skill in the art, the control logic may be implemented using any of a number of known programming and processing techniques or strategies and is not limited to the order or sequence illustrated or described. For example, interrupt or event driven processing is typically employed in real-time control applications, such as control of an engine or vehicle. Likewise, parallel processing, multi-tasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

Figure 3:
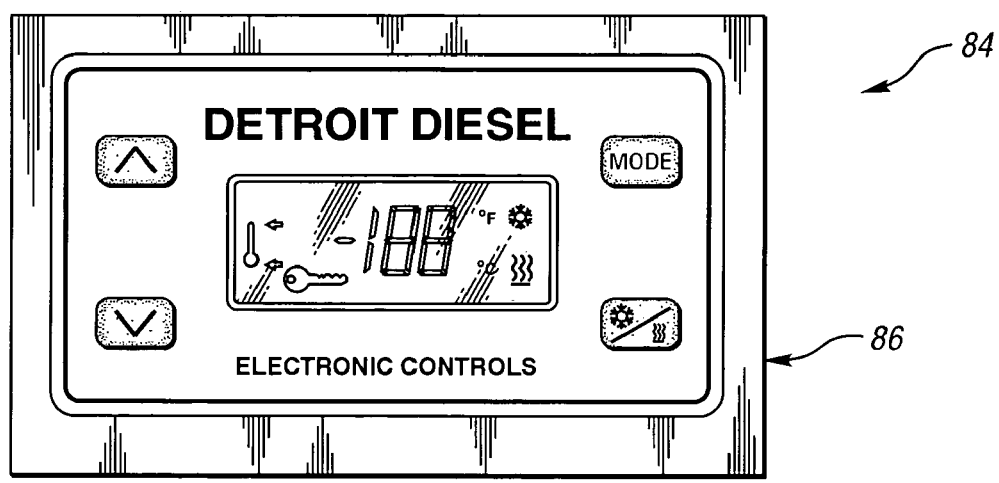
FIG. 3 is a diagrammatic and schematic representation of the control with parts removed for the sake of clarity.

As best shown in FIG. 3, the method of the present invention may be conveniently incorporated in a programmable electronic control unit, for example a DDEC controller of Detroit Diesel Corporation. In particular, such controls include digital outputs that switch in response to programmed, threshold value being attained as indicated by the related sensor 34. For example, the output signal enable and disable thresholds may be programmed, and set as engineering experience may determine. The application code system sets the default function, number and clarity for programming each of the digital input ports and digital output ports.

The function of the output ports may be ordered at the time of engine order or configured by a vehicle electronic program system (VEPS) tool or a distributor reprogramming system (DRS) tool. Similarly, the RPM values or the polarity can be set as desired.

The preferred embodiment is demonstrated by employing the present invention in the Optimized Idle® automated start and stop control system 84 that may be obtained with DDEC III/IV control systems, although the invention may be with practiced with other known electronic control module systems for machinery or vehicle controls systems. The present invention reduces engine idle time without sacrificing functionality by running the engine only when required by additional monitoring control algorithms relating to battery algorithms.

Automatic stop and restart systems start and stop the engine to accomplish any of the following activities. The controller 32 may keep the engine oil temperature between factory set limits. The controller 32 may keep the battery charged. The control may keep the cab/sleeper or passenger area at the desired temperature when a Thermostat Mode using an optional thermostat related to cabin comfort is employed.

Idle time and fuel savings information is available from the control system with a Diagnostic Data Reader (DDR) if Version 4.0 or later of DDR software is used with an automated start and stop features. Other benefits include overall reduction in exhaust emissions and noise, and improved starter and engine life (by starting a warm engine and eliminating starting aids). The system also reduces dead batteries due to electrical loads, such as refrigerators or satellite systems.

On the previously known DDEC system, automated start and stop features operates in one of two modes. An Engine Mode Automated start and stop features is used to keep the battery charged and the engine oil temperature between factory set limits. The DDEC system also includes a Thermostat Mode feature to keep the cab/sleeper (on-highway truck) and passenger area (coach) at the desired temperature and to maintain the Engine Mode parameters. The optional thermostat must be turned ON for Thermostat Mode to be active. The Optimized Idle Active Light is illuminated whenever the automated start/stop feature is active.

In a known Detroit Diesel DDEC control system, the start and stop feature is enabled by a combination of switch sensed conditions, although other means of actuating the feature may be employed without departing from the present invention. The enabling combination may include activating by maintaining the ignition switch in the "ON" position, the engine idling. The hood, cab, or engine compartment door(s) are closed as indicated by sensors. The transmission selector is in neutral. The transmission may also be in a selected range, for example high range, where multiple ranges are selectable. The parking brakes are set. The Idle Shutdown Timer is enabled by activation as discussed.

The known system may include options such as cruise control. If the vehicle is equipped with Cruise Control, the Cruise Master Switch must be moved to the "ON" position after the vehicle is idling and the above conditions are set. If the Cruise Master Switch is on prior to the vehicle idling, turn it to "OFF." Turn the Cruise Master Switch to "ON" after the vehicle is idling and the above conditions are met.

The automated start and stop feature is disabled by turning the Cruise Master Switch OFF, or using the drive away feature discussed below. If the engine is not running, pressing the clutch will be sensed to disable start and stop idle. The indicator light is on when start and stop idle is active. If the transmission lever moved while Automated start and stop features is active, this could be sensed and disable automated start and stop idle operation. An engine compartment alarm sounds briefly prior to any start and stop idle operation engine start. After start and stop idle starts the engine, the speed will be set to a limited RMP, for example, 1100 RPM.

Once the enabling conditions are met, the indicator light will flash, the light will stop flashing and stay on after the idle shutdown timer expires and the control stops the engine. The automatic start and stop operation indicator light flashes to indicate that start and stop idle will begin operation after the idle shutdown timer expires with the feature enabled, the control will shut down the engine when the battery voltage, engine temperature, and cab temperature values are met. The engine will restart only when the ECM 32 determines that the engine needs to start to charge the battery, warm the engine in engine mode, or heat or cool the interior in thermostat mode.

The automatic start and stop feature may be selected to operate in Engine Mode only. In such a mode, the control 32 will stop and restart the engine as necessary, to keep engine temperature between a selected range of temperatures, for example 60° F. (16° C.) and 104° F. (40° C.) (that may be factory set limits) and to keep the battery charged. When the engine starts due to sensing of a low battery voltage, for example less than 12.2 V on a 12 V system or less than 24.4 V on a 24 V system, the engine will run for a selected time, for example, a minimum of two hours.

Engine Mode is actuated by starting the engine and letting it remain idling. Closing and securing the hood, cab, or engine compartment door(s) will be necessary. The transmission selector is positioned in neutral, and in high range (if equipped). Applying the parking brakes. If Cruise Control, is a control feature, turn the Cruise Master Switch to the "ON" position. If the switch was previously on, turning it off and then on after the vehicle is idling will be required. Nevertheless other options and actuators may be employed without departing from the invention. The start and stop idle active light flashes following the enabling program. When the idle shut down timer expires, the start and stop idle light will stop blinking and remain on. The engine will stop and restart as needed to respond to the battery voltage sensor or the engine oil temperature sensor.

If the engine does not start after the second start attempt during automatic start and stop idle operation, or if the vehicle moves while automatic start and stop idle is enabled, an indicator, for example, the Check Engine Light (CEL) will turn on to indicate that start and stop has been disabled and active indicator light will turn off. The ignition must be turned to the "OFF" position, the engine restarted, and the actuating conditions met in order to again enable automatic start and stop idle operation.

The following procedure will initiate a Thermostat Mode operation in the control of the preferred embodiment. Again, a combination of switch actuators is employed, although another dedicated actuator, or combination of switches, may be employed without departing from the present invention.

After starting the engine and letting it remain idling, closure and/or securement of the hood cab, or engine compartment door(s) can be confirmed by sensors input to the control. Putting the transmission in neutral, and in high-range if equipped is also sensed. Applying the tractor parking brake is also sensed, if Cruise Control is a control feature, turn the Cruise Master Switch to the "ON" position. If the switch was previously on, turning it off and then on after the vehicle is idling will be required. Nevertheless, other options and actuators may be employed without departing from the invention. The automatic start and stop idle active light flashes following the enabling procedure. Setting the tractor heater or air conditioning to maximum, and setting the heater or A/C fan controls on the dash and sleeper areas of the vehicle to high will minimize engine run time. Turning the compartment thermostat on for example, by pressing any button on the display. Select cooling switch or heating switch by pressing a heating ventilation, and cooling actuator, and matching the setting on the heating and A/C controls. The control is selectively adjusted to set the desired interior temperature by an operator's pressing up or down buttons on the control interface.

The automatic start and stop feature will now stop and restart the engine, only when required, to keep the interior at the desired temperature. When the interior requires heating or cooling, the heating icon or the cooling icon will flash. When the engine starts, engine speed set by the control will ramp up to 1100 RPM. The fan and accessories will turn on, preferably after a delayed period, for example, 30 seconds after the engine starts. To turn off the thermostat and exit the Thermostat Mode, press and hold Mode button for a time period, for example, for 3 seconds. The automatic start and stop feature is now switched to Engine Mode operation. Otherwise, the thermostatic sensor continues to influence control of the engine and restarts.

If the engine does not start after the second start and stop idle attempt, or if the vehicle moves while start and stop idle is enabled, the check engine light (CEL) will turn on to indicate that start and stop idle has been disabled and active light will turn off. The ignition must be turned to "OFF," the engine restarted, and the setting conditions previously discussed arranged in order to enable automatic start and stop idle operation. Under normal conditions, the engine will cycle on and off to keep the interior at the desired temperature. Two automatic conditions which help keep the operator comfortable and reduce engine cycling are described in the next sections. Drive away disables start and stop idle and allows the vehicle to be driven without cycling the ignition. Drive away allows the use of DDEC features such as Variable Speed Governor (VSG) or cruise VSG.

When the engine is running with automatic start and stop idle active, releasing the parking brake, and putting the transmission into gear, or turning off the Cruise Switch will disable the feature. Letting the engine return to base idle will extinguish active light on the interface. If the engine is not running, starting the engine will disengage the feature, where releasing the parking brake, putting the transmission into gear, or turning off the Cruise Switch, will turn the active light on the interface off.

As shown in FIG. 3, the controller monitors a time interval between an automated start and stop operation initializing and elapsed time. The controller determines when the interval exceeds a predetermined threshold interval that has been selected to represent a duration beyond that a vehicle operator would spend in the cabin. For example, an interval more than 12 hours may be determined to represent a lay over period at which thermostat control is no longer needed. Then the control restarts the engine only in response to conditions sensed in the Engine Mode of automated start and stop idling. Thereafter, starting would be initiated only by battery charging needs or fluid temperature needs.

A new calibration parameter tas_thermostat_max_time may include values, preferably in the range of 0–24 hours. An additional calibration parameter is tas_thermostat_mode_disable and occupied by yes or no values. If tas_thermostat_mode_disable value is no, then the automated start and stop operation responds to all requests by the comfort thermostat detector relied upon in Thermostat Mode for changes requiring start up of the engine. If tas_thermostat_mode_disable value is yes, a timer is started when automated start and stop operation is initiated. When tas_thermostat_max_time is exceeded, the control may ignore further requests from the comfort thermostat to start the engine. The control will also log an inactive code that Thermostat Mode is being ignored, and may generate an indication on the interface 86, for example, a check engine light (CEL). These parameters may be set by DDR, DDDL, DRS or VEPS.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for reducing idle operation over a prolonged period of automated start and stop control responsive to ambient temperature or battery conditions by a thermostat mode control, the method comprising:
   limiting thermostat mode operation to a predetermined time limit by:
   setting a programmable time limit value;
   sensing when said time limit has expired during operation of said automated control;
   disabling response to requests for startup from the thermostat mode control after said sensing has detected expiration and said automated control remains active.

2. The invention as described in claim 1 and comprising logging an inactive code for said thermostat mode when said disabling occurs.

3. The invention as described in claim 1 and comprising indicating that requests for startup are disabled from said thermostat mode control.

4. An override control for disabling a thermostat mode control of a vehicle engine control including automated start and stop control responsive to ambient or battery conditions; the override control comprising:
   a memory storing a programmable time limit value selected as representative of intentional long term unattended;
   a switch control responsive to said detector for disabling responses to requests for startup from said thermostat mode control.

5. The invention as described in claim 4 and comprising a logger for recording code indicative of switch control operation.

6. The invention as described in claim 4 and comprising an indicator for signaling switch control operation.

7. A computer readable storage medium having data stored therein representing instructions executable by a computer to control a compression ignition internal combustion engine installed in a vehicle to perform automated start and stop operation, including a thermostat mode operation, the computer readable storage medium comprising:
   instructions for limiting thermostat mode operation to a predetermined uninterrupted time limit, including;
   instructions for setting a programmable time limit value;
   instructions for sensing when said start and stop operation has been operating and said time limit has expired;
   instructions for disabling response to requests for startup from the thermostat mode control when said sensing instructions have detected said time limit is expired during operation of said automated start and stop operation.

8. The invention as described in claim 7 and comprising instructions for logging said disabling requests to start from said thermostat mode control.

9. The invention as described in claim 7 and comprising instructions for indicating that requests to start from said thermostat mode control are disabled.

* * * * *